United States Patent Office 3,430,469
Patented Mar. 4, 1969

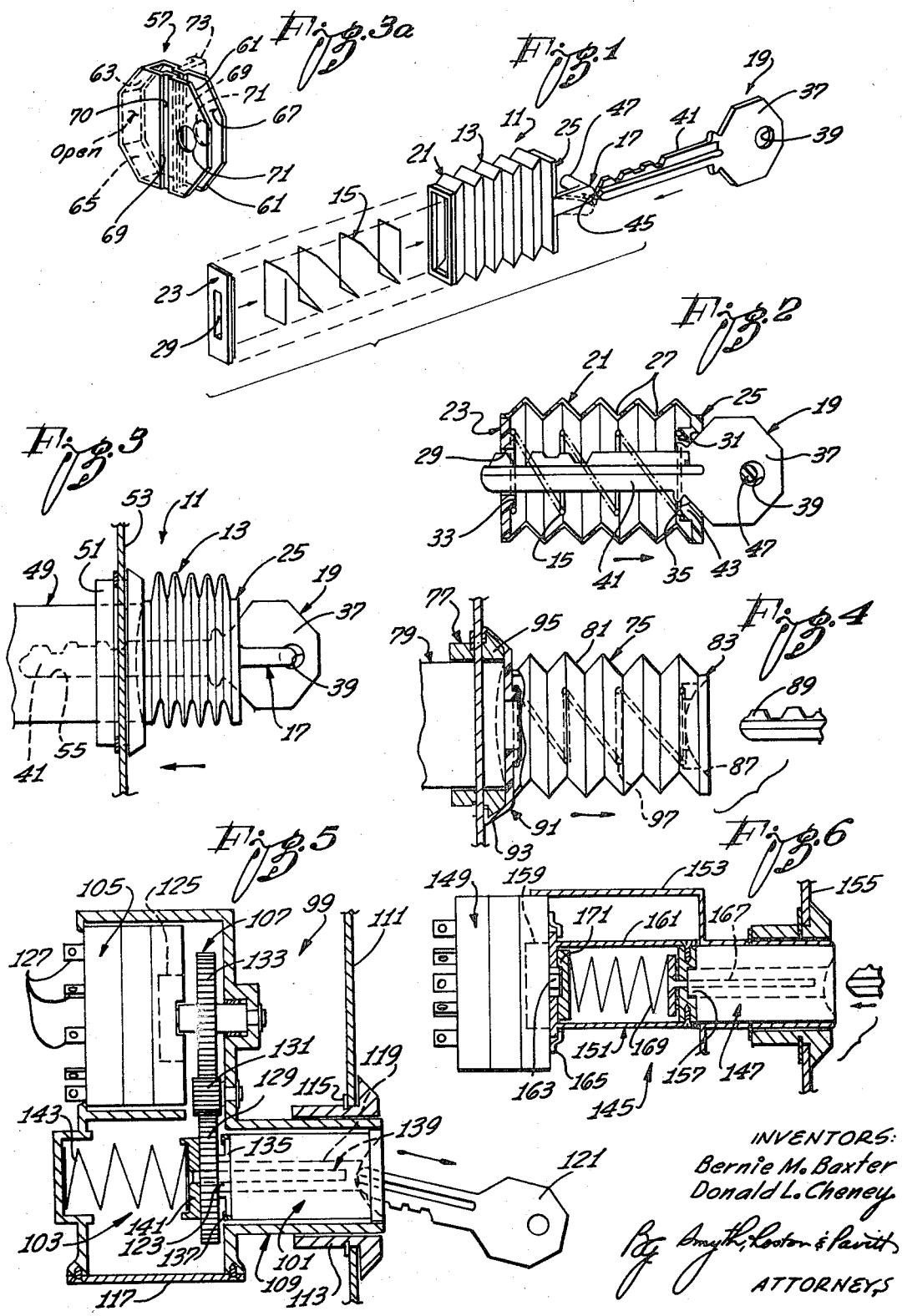

3,430,469
KEY EJECTOR
Bernie M. Baxter, 2027 W. Berridge Lane, Phoenix, Ariz. 85017, and Donald L. Cheney, 1319 E. Howell St., Seattle, Wash. 98122
Filed July 19, 1967, Ser. No. 654,512
U.S. Cl. 70—388                                7 Claims
Int. Cl. E05b 17/12, 65/12, 17/04

ABSTRACT OF THE DISCLOSURE

This disclosure describes a key ejector which includes an axially collapsible housing and biasing means for urging the housing toward an extended position thereof. A key is suitably secured to the key ejector and extends therethrough so that upon insertion of the key into the lock, the housing is axially collapsed and the biasing means is compressed or cocked. Thus, whenever the key is unrestrained by the lock or the user, the biasing is automatically operative to expand the housing and eject the key from the lock. In another form of the invention, the key ejector is embodied as a permanent part of a vehicle ignition.

Background of the invention

It is estimated that many automobile thefts are made possible or at least made easier because drivers, inadvertently or otherwise, leave the keys in the ignition. It is the general recommendation of most law enforcement agencies and other government bodies concerned about the relatively large number of automobile thefts, that the keys never be left in the ignition when the driver is not in the vehicle.

To solve this problem, the use of key ejecting mechanisms have been suggested. A key ejector, as the words imply, forces the key from the ignition to prevent the the key from being inadvertently left.

The prior art is replete with key ejectors of various kinds all of which have numerous disadvantages. Many of the prior art key ejectors have been designed for use with ordinary locks and are not suitable for use to eject automobile keys from the ignition.

There are two general types of key ejectors that might be used with a vehicle such as an automobile. In the first type, the key ejector is attached to the key and is carried therewith whether or not the key is in the ignition. This type of ejector typically includes a spring for ejecting the key and a case for containing the spring and other elements of the ejector. In one form the housing is rigid and consists of several different members, some of which must be slotted or otherwise shaped in order to allow the key to move relative to the housing. This form of housing is expensive, bulky, and heavy. Further, the rigid housing is subject to permanent deformation if it is dropped, stepped on, or otherwise roughly handled. Permanent deformation of the housing may prevent sliding of the key therein relative to such housing and thereby render the device useless for its intended purpose.

In a second form of housing, the housing includes numerous rigid frustoconical telescoping sections which make the housing relatively expensive and difficult to assemble. Further, the telescoping sections are subject to malfunctioning in the event foreign particles get between the surface of adjacent sections, or in the event that one of the relatively rigid telescoping sections is deformed.

The second general type of key ejector is similar to the first described type except that in the former the key ejector is merely fixed to a suitable support structure adjacent the key hole of the lock. Merely affixing the ejector to the lock in this fashion does not solve the above-described problems.

The ignition of a modern automobile typically includes a key cylinder and a terminal block. The key cylinder is the mechanism into which the automobile key is inserted and it contains various tumblers which allow rotation of the key inserted therein if such key is of the appropriate shape. The key cylinder also includes a hub which pivots in response to turning of the key in the key cylinder. The hub is drivingly connected to a rotor of the terminal block so that when the key is turned, for example, to the "on" position, the hub drives the rotor. Turning of the rotor to the "on" position completes a circuit which allows operation of various electrical devices within the vehicle. Similar action occurs when the key is turned to the other usual position provided for in automobile ignition systems.

The prior art key ejectors are generally not suited for cooperation with such a key cylinder and terminal block, nor are they suited for use and/or installation in a concealed position rearwardly of the dashboard. Use of a key ignition mechanism in combination with the ignition block and key cylinder is made difficult because there is no substantial space between the key cylinder and the ignition block and because a driving connection between the hub and rotor must be maintained. Thus, to adapt a prior art ejector for such use would require substantial modification of existing ignition switch components.

Summary of the invention

In connection with a key ejector of the type which is affixed to the key, a primary concept of this invention is to utilize a kep ejector housing having a peripheral wall which is collapsible and constructed of flexible material. As the peripheral wall of the housing is flexible, it is not subject to permanent deformation of the type which would prevent operation of the ejector. The peripheral wall of the housing is preferably in the form of a unitary sleeve and as such contains no rigid telescoping sections which could become inoperative due to the presence of particulate matter between the mating surfaces thereof. Thus, longer life and improved reliability are assured. To facilitate axial changes of length of the peripheral wall, it is preferred to provide a peripheral wall for the housing which is of a bellows configuration. Various flexible materials such as plastic, leather, etc. can be used. The peripheral wall is preferably a unitary section to reduce the cost of the article and the time required for assembly.

The concepts described above can be conveniently embodied in a key ejector which includes a housing having a peripheral wall and first and second end closure sections for closing the opposite ends of the housing. The end closure sections are appropriately apertured to receive at least the shank portion of a key. The key extends through the housing and is suitably retained therein. Biasing means such as a coil spring is provided within the housing to urge the housing to an axially extended position.

In use, the end of the key is inserted into a lock and as the insertion of the key continues, the housing and spring are axially collapsed between the lock and the hand of the user. The key ejector is automatically operative to eject the key from the lock as soon as there is an absence of a sufficient restraining force either from the lock itself or from the hand of the user. Of course, this type of key ejector is usable with locks of all kinds and is not limited to automobile ignition switches.

The present invention also teaches attaching of a key ejector to a lock or the supporting structure therefor (referred to generically herein a lock structure) adjacent the key hole opening of the lock. This can be accomplished in any suitable manner by merely providing means on the key ejector for achieving such attachment. With the ejector attached to the lock or the supporting structure therefor, the key is not attached to the ejector. This form of the invention is particularly useful when it is desired to permanently install a key ejector on an existing lock. Of course, this embodiment of the invention is also applicable to lock other than those found in vehicle ignitions.

Still another concept of this invention is to provide a permanent key ejector for a vehicle or automobile ignition without necessitating any substantial change in the standard key cylinder and terminal block. The key ejector is preferably concealed behind the dashboard within the vehicle. The key ejector functions to automatically eject the key in any position of the key in which the key cylinder does not lock the key therein. Thus, in a typical case, the key is ejected only when the ignition is turned to the "off" position.

This latter concept of the invention can be embodied, for example, in combination with the usual key cylinder and terminal block of a vehicle. The present invention teaches displacing the terminal block from its usual position contiguous or closely adjacent the key cylinder to provide space for the key ejector. The key ejector includes a key ejector member which extends through the key passageway in the key cylinder and biasing means which acts on the key ejector member to force it toward the entrance of such pasageway. Thus, when the key is inserted into the passageway it acts on the key ejector member to force the latter toward the outlet of such passageway and in so doing compresses the biasing means. Accordingly, whenever the key is turned to the "off" position, in which the key cylinder no longer automatically retains the key therein, the ejector is operative to eject the key.

It is, of course, essential that a driving relationship be maintained between the rotor of the terminal block and the hub of the key cylinder in order that turning of the key will result in corresponding movement of the rotor to make or break the various circuits in the vehicle. This can be accomplished in a number of ways, one of which is to offset the terminal block radially from the axis of the passageway in the key cylinder and to drivingly interconnect the hub and the rotor with a suitable system of gears. Alternatively, the terminal block may be displaced axially from its usual position and a hollow drive shaft may surround the spring of the ejector and serve as the driving link between the hub of the key cylinder and the rotor of the terminal block.

The invention, both as to its organization and method of operation together with further features and advantages thereof may best be understood by reference to the following description taken in connection with the accompanying drawing.

*Brief description of the drawing*

FIG 1 is an exploded perspective view of one form of key injector constructed in accordance with the teachings of this invention.

FIG. 2 is a longitudinal sectional view through the key ejector with the housing being in the extended position thereof.

FIG. 3 is a side elevational view of the key ejector retained within the lock and with the housing being in the collapsed position.

FIG. 3a is a perspective view showing an insert for attaching the key to the housing.

FIG. 4 is a side elevational view partially in section of a second form of key ejector in which the ejector is affixed to the exterior of a lock adjacent the entrance to the key passageway thereof.

FIG. 5 is a sectional view of a vehicle ignition system embodying still another form of the key ejector of this invention.

FIG. 6 is a sectional view illustrating a modification of the form shown in FIG. 5.

*Description of the preferred embodiments*

Referring to the drawing and in particular to FIGS. 1–3 thereof, reference numeral 11 designates one form of key ejector constructed in accordance with the teachings of this invention. Generally, the key ejector 11 includes a housing 13, a spring 15, and a key retainer 17 for securing a key 19 to the housing. The housing 13 is hollow and includes a peripheral wall 21 and inner and outer end closure sections 23 and 25, respectively. Although the housing 13 may be circular, in the embodiment illustrated it is elongated in transverse cross section to reduce the size of the ejector 11 to a minimum. The peripheral wall 23 is constructed of a flexible material which allows variations in the axial length of the housing 13 between an extended position shown in FIGS. 1 and 2 and a collapsed position shown in FIG. 3. To further facilitate axial collapse of the housing 13 and to control the collapsing and expanding movements thereof, the peripheral wall 21 is preferably of bellows-like construction. Thus, as shown in FIG. 2, the peripheral wall 21 in longitudinal cross section forms a plurality of side by side V-shaped sections 27.

To reduce the number of parts required for the key ejector 11, the peripheral wall 21 and the closure section 25 may, if desired, be formed integrally. This feature is particularly advantageous when the key ejector housing 13 is constructed of molded plastic material. In order to allow easy insertion of the spring 15 the closure section 23 is preferably formed separately and then secured as by an adhesive to the opposite or inner end of the peripheral wall 21. Of course, both of the closure sections 23 and 25 may be formed separately and suitably secured to opposite ends of the peripheral wall 21, if desired.

The closure sections 23 and 25 are provided with an axially extending opening 29 and an axially extending key receiving aperture 31, respectively. The spring 15 may be retained in position within the housing 13 by a boss 33 formed integrally with an protruding axially inwardly of the closure section 29 and by an annular groove 35 formed integrally in the closure section 25.

The key 19 is merely illustrative of the type of key which may be utilized with the key ejector 11. The key 19 has an enlarged head portion 37 having an aperture 39 extending transversely therethrough. The aperture 31 and the opening 29 are sized to receive a shank portion 41 of the key 19. The closure section 25 may have an abutment 43 to prevent complete entry of the head portion 37 into the key ejector 11. In the embodiment illustrated, the abutment 43 is formed by sizing of the aperture 31 to prevent the head 37 of the key from entering the interior of the key ejector 11. The ejector 11 and the key 19 may be of any length; however, the relative length of the key and ejector are preferably selected so that an end portion of the shank portion 41 of the key 19 will project through the opening 29 when the housing 13 is in the extended position, as shown in FIG. 2.

The key 19 may be secured to the housing 13 in a 1–3 this is accomplished by the key retainer 17 which includes a bendable axially extending web 45 and a finger 47 which extends transversely from the end of the web 45. As shown in FIG. 1, the web 45 is bendable outwardly to the position shown in dashed lines. By inserting the key 19 into the housing 13, as shown in FIG. 2, and by bending the web 45 outwardly, the finger 47 may be caused to enter the aperture 39 in the key 19 as shown in FIG. 2. Thus, the finger 47 cooperates with the aperture 39 to secure the key to the ejector 11. Fabrication of the key retainer 17 is particularly advantageous when the ejector 11 is constructed of molded plastic material for in this event the retainer 17 may be molded integrally with the closure section 25.

With the key 19 installed in the ejector 11 as shown in FIG. 2, it is ready for use with a lock 49 (FIG. 3). The lock 49 may be a key cylinder of a vehicle ignition, a fixed lock of the type used on doors, a padlock, or virtually any type of lock. In the embodiment shown in FIG. 3, the lock 49 is mounted by a retaining ring 51 to a suitable supporting structure 53.

In use of the ejector 11, the end of the key 19 is inserted into a key passageway 55 in the lock 49. The user then pushes inwardly on the head portion 37 of the key 19 to force the shank portion 41 fully into the passageway 55 and to simultaneously compress the spring 15 between the head portion 37 and the supporting structure 53 and axially collapse the housing 13 to the position shown in FIG. 3. The key 19 may then be turned to operate the lock 45. As the spring 15 is compressed, as soon as the lock 49 or the user does not retain the key in the lock 49, the spring 15 expands to automatically eject the key and the ejector 11 from the lock. More particularly, as the spring expands, the closure section 25 moves to the right as viewed in FIG. 3 and thereby withdraws the shank portion 41 from the key passageway 55. When the shank portion 41 is no longer retained by the lock 49, the ejector 11 will fall from the lock.

FIG. 3a shows an insert 57 which can be used in lieu of the key retainer 17 for securing the key to the housing 13. The insert 57 includes two generally parallel resilient plate members 59 and 61 interconnected, for example, by a pair of webs 63 and 65 and defining a key head receiving slot 67 therebetween. The plate members 59 and 61 are indented to form a pair of generally opposed inwardly projecting ribs 69 and outwardly opening grooves 70. The plate members 59 and 61 also have aligned apertures 71.

The insert 57 is used with a modified form of end section 73 which is identical to the end section 25 except that the former is made larger and has a larger aperture therethrough to receive the insert 57. In use of this modified form of the invention, the insert 57 is placed within the aperture of the end section 73 with the outwardly facing grooves 70 in registry with the edges of the aperture in the end section 73. Next, the key 19 is inserted into the insert 57 until the aperture 39 thereof is in registry with the apertures 71. The inner surfaces of the ribs 69 are spaced so that as the key is inserted into the slot 67, the key cams the ribs and hence the grooves 69 outwardly to snugly embrace the rim of the aperture in the end section 73. If desired, the surfaces of the ribs 69 which engage the key may be appropriately tapered to facilitate such camming action. Next, a ring (not shown) or other device is inserted through the aperture 39 and the apertures 71 to secure the key 19 to the insert 57.

FIG. 4 illustrates a key ejector 75 which is permanently attached to supporting structure 77 for a lock 79. Alternatively the ejector 75 could be attached directly to the lock 79. The ejector 75 includes a peripheral wall 81 which may be identical to the peripheral wall 21 and an outer closure section 83 which may be identical to the closure section 25 except for the presence of a concave surface 85 for guiding a key 89 into the injector 75.

The ejector 75 also has a closure section 91 which is identical to the closure section 23 except that the former has attachment means 93 for firmly and rigidly attaching the ejector 75 to the supporting structure 77. Although the attachment means 93 may take many forms in the embodiment illustrated, such means includes a skirt, the ends of which are crimped over an annular flange 95 on the supporting structure 77. Alternatively, threaded fasteners could be used to secure the key ejector 75 to the supporting structure 77. As in the above-described embodiment, a spring 97 urges the peripheral wall 81 toward an extended position. The operation of the key ejector 75 is the same as the operation of the ejector 11 described above.

The primary advantage of this form of the invention is that the ejector 75 may be permanently affixed to existing locks without alteration of the structure thereof. Of course, the lock 79 may be of any type and may, if desired, be a key cylinder for a vehicle ignition system.

FIG. 5 illustrates another form of the invention in which a key ejector is made a permanent part of a vehicle ignition system. Generally, FIG. 5 illustrates an ignition assembly 99 which includes a key cylinder 101, a key ejector 103, a terminal block 105, and a gear train 107 drivingly interconnecting the key cylinder and the terminal block. The several components of the ignition assembly 99 can be suitably encased within a housing 109 which is suitably mounted in a concealed position to the rear of a dashboard 111 of a vehicle. The portion of the housing 109 surrounding the key cylinder 101 is received within a tubular member 113 which is attached to the dashboard 111 by a suitable retainer 115. Access to the interior of the housing 107 is provided by a removable access panel 117.

The key cylinder 101 is of conventional design and accordingly is not shown in detail herein. The key cylinder 101 has a key receiving passageway 119 therein which extends between the inner and outer ends of the key cylinder. As is well known, the key cylinder is provided with numerous tumbler which allow turning of an appropriate key 121 when such key is fully inserted into the passageway 119. The key cylinder 101 allows turning of the key 121 between "off" and "on" positions. In addition, the key cylinder 101 may also have accessory and start positions to which the key can be turned. The key cylinder 101 has a hub 123 on the inner end thereof. The key cylinder 101 is operative, in conventional fashion, to turn the hub 123 in response to turning of the key 121 between the various positions thereof within the key passageway 119.

The terminal block 105 is also of conventional designs and includes a rotatably mounted rotor 125 shown schematically in FIG. 5 and several terminals 127. The terminal block 105 in response to an appropriate degree of rotation or pivotal movement of the rotor 125 is operative to make or break the various circuits necessary for vehicle operation. For example, when the key 121 is turned to the start position, the rotor 125 is appropriately turned to complete a circuit necessary for energization of the starting motor.

Ordinarily, the ignition block 125 is contiguous to the key cylinder 101 so that the hub 123 can directly drive the rotor 125. Accordingly to the present invention however, the key ejector 103 is juxtaposed to the key cylinder 101 and the terminal block 109 is offset radially from the key cylinder 101 so that the rotational axes of the hub 123 and the rotor 125 do not coincide.

According to this form of the invention, the hub 123 drives the rotor 125 through the gear train 107. The gear train 107 includes a driving gear 129, a smaller intermediate gear 131, and a driven gear 133 which is preferably identical to the gear 129 so that the gear train 107 will have a driving ratio of one. Thus, the gear train 107 does not upset the hub-to-rotor driving ratio so that standard key cylinders and terminal blocks may be used. The gear 129 is mounted on the hub 123 by an attachment member 135 which snugly receives the hub 123. The periphery of the attachment member 135 may be retained by a suitable bearing 137, if desired.

The gears 131 and 133 may be mounted directly to one wall of the housing 109 in any suitable manner. In addition, the driven gear 133 is preferably directly connected to drive the rotor 125.

The key ejector 103 includes a key ejector member 139 which passes through a suitable axial aperture in the gear 129 and extends a substantial distance into the key passageway 119. The key ejector member 139 is sufficiently small so as not to interfere with the tumblers of the key cylinder 101 and must be sufficiently sturdy to accomplish the key ejecting function. The inner end of the key ejector member 139 is mounted on a disc 141 which is urged to the right, as viewed in FIG. 5, by a suitable coil spring 143. The spring 143 normally urges the key ejector member 139 to the position shown in FIG. 5 in which the disc 131 abuts the gear 129. With the components of the ignition assembly 99 disposed as shown in FIG. 5, the key 121 can be inserted into the passageway 119 of the key cylinder 101. As the key 121 is inserted, the end of the key engages the end of the key ejector member 139 and forces the latter to the left against the biasing action of the spring 143. When the key 121 is fully inserted, it can be turned to the desired position. Such turning of the key imparts a given increment of pivotal movement to the hub 123 which is transmitted through the gear train 107 to the rotor 125. Because three gears are used in the gear train 107, the rotor 125 is caused to rotate in the same direction as the hub 123. Thus, the rotor 25 can perform its function in the usual manner without the need for modification thereof.

With the key 121 turned to any position other than the "off" position, the key cylinder 101 automatically locks the key therein to prevent withdrawal thereof. Accordingly, the spring 143 is maintained in a compressed or cocked position. However, when the key 121 is turned to the "off" position and the key cylinder 101 no longer retains the same therein, the spring 143 expands to force the key ejector member 139 to the right to thereby forcibly eject the key from the key cylinder.

FIG. 6 shows an ignition assembly 145 which is a modification of the ignition assembly 99. The ignition assembly 145 includes a key cylinder 147 and a terminal block 149 which are identical to the corresponding elements shown in FIG. 5. The ignition assembly 145 also includes a key ejector 151 and a housing 153 in which the components of the assembly 145 are suitably encased, the housing 153 being suitably mounted in a concealed position to the rear of a dashboard 155 of a vehicle.

The key cylinder 147 has a hub 157 and the terminal block 149 has a rotor 159. A hollow drive shaft 161 is suitably drivingly connected to the hub 157 at one end and to the rotor 159 at the other end thereof. In the embodiment illustrated, the drive shaft 161 has a recess at one end for drivingly receiving the hub 157 and a stub shaft 163 at the other end thereof for driving the rotor 159, it being understood that various forms of driving connections between the shaft 161 and the hub and rotor may be utilized. If desired, the drive shaft 161 may be retained by a bearing 165. Accordingly, the drive shaft 161 is opeartive to directly drive the rotor 159 in response to an increment of rotation of the hub 157.

The key ejector 151 includes a key ejector member 167, a spring 169 within the shaft 161, and a mounting plate 171, against which one end of the spring 169 bears. The operation of the embodiment of FIG. 6 is identical to the embodiment of FIG. 5. It can be seen therefore that the primary difference between the embodiments of FIGS. 5 and 6 is that the rotational axes of the rotor 159 and the hub 157 coincide and that the hollow drive shaft 161 is used in lieu of the gear train 107.

Although exemplary embodiments of the invention have been shown and described, many changes, modifications, and substitutions may be made by one having ordinary skill in the art without necessarily departing from the spirit and scope of this invention.

We claim:

1. In an ejector for ejecting a key from a vehicle ignition switch, the combination of:
 a key cylinder having inner and outer ends and a passageway extending therethrough between said ends, said key being receivable in said passageway and movable in said key cylinder between an off position and a second position, said key cylinder including means for allowing withdrawal of the key from said passageway when the key is in said off position and means for preventing withdrawal thereof when the key is in said second position;
 said key cylinder including a pivotable driving member adjacent the inner end thereof and means for pivoting said driving member in response to movement of the key between the off and second positions thereof;
 a vehicle ignition block including a rotor, said rotor having an axis of rotation which is radially offset from the pivotal axis of said driving member;
 a key ejector housing;
 means for mounting said housing closely adjacent the inner end of the key cylinder without having said housing extend therethrough, said ignition block being positioned adjacent said housing member;
 a key ejector member mounted for movement within said housing and protruding into the passageway from the inner end thereof without projecting into said rotor, said key ejector being movable generally axially within said passageway, said ignition block being radially offset from said key ejector member;
 biasing means within said housing for urging said key ejector member generally axially toward the outer end of said passageway to an extended position, said key ejector member being engageable by the key upon insertion thereof into said passageway and movable generally axially toward the inner end of the key cylinder against the force of the biasing means to a retracted position, said key ejector member being movable between said extended and retracted positions without projecting through said ignition block, said key ejector member being locked in said retracted position by the key upon turning of the key to the second position thereof whereby upon placing of the key in the off position the biasing means urges the key ejector member toward the outer end of the key cylinder to eject the key therefrom; and
 means for drivingly connecting said driving member of said key cylinder to said rotor of said ignition block whereby turning of the key between said positions thereof turns said rotor.

2. A combination as defined in claim 1 wherein said last mentioned means includes a gear member mounted on said pivotable driving member for pivotal movement therewith, said gear member having an opening therethrough through which said key ejector member can project into said passageway of said key cylinder, said last mentioned means also including gear means drivingly connected to said rotor and cooperating with said gear member for drivingly connecting said pivotable driving member of said key cylinder to said rotor of said ignition block.

3. A combination as defined in claim 1 wherein said last mentioned means includes gear means for drivingly interconnecting said driving member of said key cylinder and said rotor of said ignition block.

4. In an ignition system for a vehicle, the combination of:
 a key cylinder having inner and outer ends and a passageway extending therethrough between said ends, the key being receivable in said passageway and movable in said key cylinder between an off position and a second position, said key cylinder including means for allowing removal of the key from said passageway when the key is in said off position and means for preventing removal thereof when the key is in said second position;
 said key cylinder including a first member adjacent the inner end thereof and means for pivoting said first member in response to movement of the key between the off and second positions thereof;
 a vehicle ignition block including a rotor, said ignition block and said key cylinder being axially spaced;
 a key ejector interposed entirely between said key cylinder block to thereby permit use of existing key cylinders and ignition blocks without significant modification thereto;
 said key ejector including a drive member drivingly connected at one end to said first member and at the other end to said rotor of said ignition block, said drive member lying entirely between said key cylinder and said rotor, said drive member providing a space therein at least at the end thereof adjacent said key cylinder; and said key ejector including a key ejector member mounted for movement within said space and protruding into the passageway of the key cylinder from the inner end thereof and biasing means at least partially within said space for urging said key ejector member generally axially toward the outer end of said passageway, said key ejector member being engageable by the key upon insertion thereof into said passageway and movable generally axially toward the inner end of the key cylinder against the force of the biasing means to a retracted position, said key ejector member being locked in said retracted position by the key upon turning of the key to the second position thereof whereby upon placing of the key in the off position the biasing means urges the key ejector member toward the outer end of the key cylinder to eject the key therefrom.

5. A combination as defined in claim 4 wherein said first member includes a hub and said drive member includes a recess at one end thereof for drivingly receiving the hub and a stub shaft at the other end thereof for driving the rotor.

6. A combination as set forth in claim 4 wherein said key cylinder, key ejector and ignition block are generally aligned.

7. In an ignition system for a vehicle, the combination of:

a housing;

a key cylinder for a vehicle ignition at least partially within said housing, said key cylinder having inner and outer ends and a passageway extending therethrough between said ends, the key being receivable in said passageway and movable in said key cylinder between an off position and a second position, said key cylinder including means for allowing withdrawal of the key from said passageway when the key is in said off position and means for preventing withdrawal thereof when the key is in said second position;

said key cylinder including a rotatable driving member adjacent the inner end thereof and means for pivoting said driving member in response to movement of the key between the off and second positions thereof;

a vehicle ignition block including a rotor, said vehicle ignition block being spaced from said key cylinder with the axes of rotation of said rotor and said drive member being at least substantially aligned, said vehicle ignition block being mounted on said housing;

means including a rotatable hollow drive shaft positioned in said housing entirely between said key cylinder and ignition block for drivingly connecting said driving member of said key cylinder to said rotor of said ignition block whereby turning of the key between said positions thereof turns said rotor;

a key ejector member mounted for movement within said hollow drive shaft intermediate said key cylinder and ignition block and protruding into the passageway from the inner end thereof, said key ejector member being movable generally axially within said passageway; and biasing means at least partially within said hollow drive shaft and intermediate said key cylinder and ignition block for urging said key ejector member generally axially toward the outer end of said passageway, said key ejector member being engageable by the key upon insertion thereof into said passageway and movable generally axially toward the inner end of the key cylinder against the force of the biasing means to a retracted position, said key ejector member being locked in said retracted position by the key upon turning of the key to the second position thereof whereby upon placing of the key in the off position the biasing means urges the key ejector member toward the outer end of the key cylinder to eject the key therefrom.

References Cited
UNITED STATES PATENTS

| | | | |
|---|---|---|---|
| 963,632 | 7/1910 | Nefflen et al. | 70—134 |
| 1,798,917 | 3/1931 | Van Degrift | 70—388 X |
| 1,917,778 | 7/1933 | Smith | 70—338 |
| 2,287,048 | 6/1942 | Mertel | 70—388 X |
| 2,568,206 | 9/1951 | Seaman et al. | 70—388 |
| 2,655,569 | 10/1953 | St. John | 70—388 X |
| 3,167,943 | 2/1965 | Schreiber et al. | 70—379 X |
| 3,320,782 | 5/1967 | Turman | 70—388 |

MARVIN A. CHAMPION, *Primary Examiner.*

PERRY TEITELBAUM, *Assistant Examiner.*

U.S. Cl. X.R.

70—379, 414